United States Patent [19]

Laubach

[11] Patent Number: 4,637,154
[45] Date of Patent: Jan. 20, 1987

[54] BULL ELK CALLING DEVICE

[76] Inventor: Donald R. Laubach, P.O. Box 127, Gardiner, Mont. 59030

[21] Appl. No.: 839,779

[22] Filed: Mar. 14, 1986

[51] Int. Cl.⁴ .................. A01M 31/06; A63H 5/00
[52] U.S. Cl. .................................. 43/1; 446/202; 446/207
[58] Field of Search ............ 43/1, 2; 446/202, 204, 446/206, 207, 208

[56] References Cited

U.S. PATENT DOCUMENTS

| 918,835 | 4/1909 | Fawkes | 446/202 |
| 2,570,816 | 10/1951 | Kimple | 446/202 X |

FOREIGN PATENT DOCUMENTS 615809  1/1949  United Kingdom ............ 446/207

Primary Examiner—Nicholas P. Godici
Assistant Examiner—Carmine Cuda
Attorney, Agent, or Firm—Richard C. Conover

[57] ABSTRACT

A calling device which has a pair of rectangular, substantially coextensive planar members, which are hinged together along corresponding edges thereof with one member being offset with respect to the other so that when the members are folded together a lip projects from the device. An endless elastic band is positioned surrounding the lip to provide a reed element positioned at the entrance into the cavity between the two members.

2 Claims, 5 Drawing Figures

BULL ELK CALLING DEVICE

BACKGROUND OF THE INVENTION

This invention relates to a device for calling or attracting the attention of bull elk or other wild animals by game hunters. The invention has particular application in imitating the whistles of a bull elk as they apparently communicate with one another in the wild.

There are several deer calls known in the art. For example, U.S. Pat. No. 2,470,823 to Luch and Canadian Pat. No. 520,645 to Carhart both show calling devices. The Luch reference discloses a deer call constructed of two elongated members. The two members are elastically joined together with a support at a corner of the two members in such a manner as to leave an elongate cavity between the members. An endless rubber band is stretched around one of the members parallel to the longitudinal axis of the member and extends through the elongate cavity between the two members. By blowing into the cavity between the members, the rubber band is caused to vibrate thereby causing a sound to be formed. The pitch of the sound can be varied by compressing the two members together to vary the size of the cavity between the two members, the support acting as a fulcrum.

The Canadian Patent to Carhart describes another deer call comprising two relatively flat elongate members which are positioned facing one another in opposing relation. Each member has a carved out concave portion. These concave portions are positioned in face-to-face relation to form an elongate cavity between the two members. A rubber band is disposed around the two members to hold the members together and has a portion disposed within the elongate cavity to form a reed. A deer call sound is made by blowing into the cavity. To vary the pitch of the sound of this instrument the rubber band is stretched to the extent desired for a particular sound.

Further there are various toy musical instruments which are known such as described in British Patent Specification No. 615,809 which describes a toy squeaker having a pair of plates formed so that when positioned facing one another, a passage is defined. A first rubber band is wrapped around the pair of plates and has a portion thereof disposed within the passage to form a reed element. A second rubber band is used to hold the plates together. The plates may be tilted relatively to one another with the portion of the first rubber band passing between the edge portions of the plates providing aligned pivots or fulcrums about which the plates pivot.

SUMMARY OF INVENTION

The present invention is an improved calling device for calling bull elk and is especially adapted to imitate the whistle sound which a bull elk makes in the wild. The significance of the present invention is that it provides an improved, simple and inexpensive calling device which is of the small size and which can be carried in a pocket and operated easily by a hunter or other person seeking game without having much experience in using the device. At the same time the device provides a game calling instrument which closely imitates the whistle of the bull elk.

The present invention includes a pair of rectangular, substantially coextensive planar members, which are hinged together along corresponding edges thereof with one member being offset with respect to the other so that when the members are folded together a lip projects from the device. The two rectangular members are bowed along their longitudinal axes having a relatively small bow at the end of the device adjacent the lip and having a bow of larger dimension at the opposite end of the device. The two members are positioned with respect to one another with their concave sides opposing one another to form a double-tapered cavity, transverse to the longitudinal axes of the two members. An endless elastic band is positioned surrounding the lip to provide a reed element positioned at the entrance into the cavity between the two members. The two members are flexible and are constructed of flexible and resilient material.

To use the device, the user inserts the lip end of the device in his mouth and bites down on the two members. The two members are squeezed together and the cavity between the two members at the end adjacent the lip is made smaller in size beginning at the outer edge and working towards the center of the cavity when pressure is applied. The user begins to blow through the cavity and releases the pressure on his teeth. The initial pitch of the resulting whistle-like sound is high pitched because of the small cavity. As the pressure on the members decreases, the cavity becomes larger and the pitch of the whistle-like sound decreases in a smooth manner. This device is intended to be used with a "grunt tube" conventionally used with bull elk calling devices. A user actually blows through this device into the grunt tube for the purpose of increasing the intensity of the whistle-like sound and also to give a resonance characteristic to the whistle-like sound which closely imitates the whistle of a bull elk in the wild.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
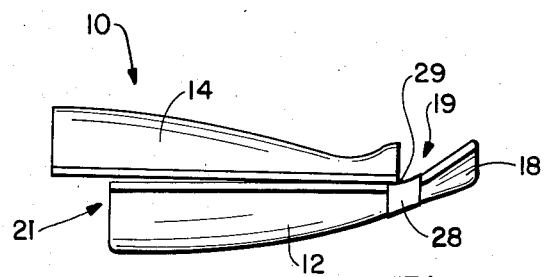
FIG. 1 is a side view of the calling device according to the present invention.
Figure 2:
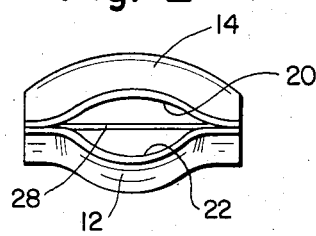
FIG. 2 is a right-hand end view of the calling device shown in FIG. 1.
Figure 3:
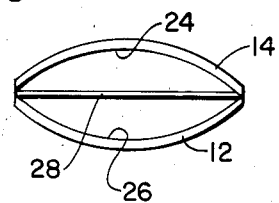
FIG. 3 is a left-hand end view of the calling device shown in FIG. 1.
Figure 4:
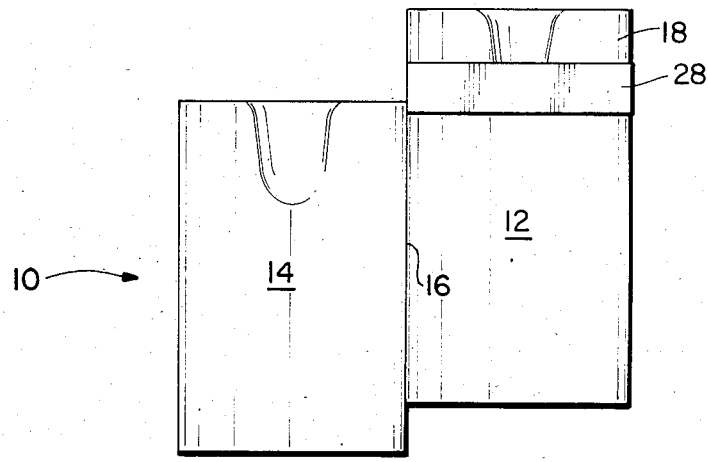
FIG. 4 is a top view of the calling device shown in FIG. 1 with the members opened out flat.
Figure 5:
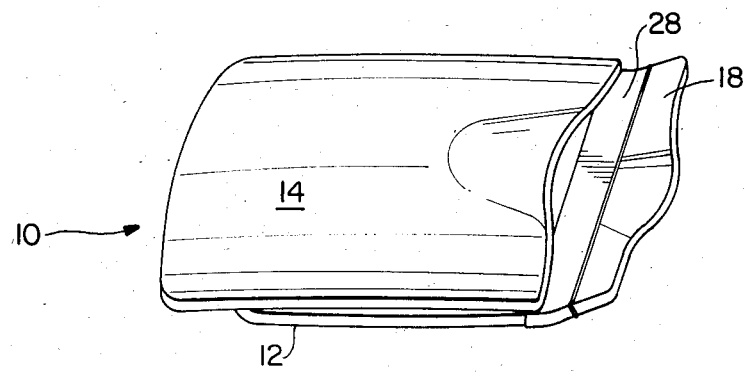
FIG. 5 is a perspective view of the calling device according to the present invention.

The present invention is shown in FIGS. 1 through 5 wherein there is shown a calling device 10 comprising a pair of rectangular members 12 and 14 which are constructed from a resilient material such as plastic. The members 12 and 14 are hingedly joined along one edge of 16 thereof as with rubber cement and as shown in FIG. 4 with the members offset with respect to one another as shown in FIG. 4. A forward portion of member 12 which extends beyond the member 14 forms a lip portion 18 of the device. The members 12 and 14 are further bowed in shape along their longitudinal axes thereof with a bow of smaller relative dimension at a first end 19 of the device adjacent the lip 18 as shown at 20 and 22 in FIG. 2 and with a bow of a larger relative dimension at a second end 21 of the device opposite the first end 19 as shown in FIG. 3 at 24 and 26. The members 12 and 14 are positioned facing one another with their concave bow sides positioned opposing one another to create an elongate double-tapered cavity or passage between bows 20 and 22 as shown in FIG. 2. This double-tapered cavity extends in a direction transverse to the longitudinal axes of the two members 12 and 14. A broad elastic band element 28, preferably constructed of latex material, is stretched around the lip portion 18 of member 12 in a direction transverse to the longitudinal axis of member 12 to act as a reed element for the subject calling device. This elastic band 28 is positioned at the entrance to the cavity formed by bows 20 and 22 as shown in FIG. 1.

Finally, lip portion 18 is bent upwardly as shown in FIG. 1 with an obtuse angle 29 occurring immediately where member 12 extends beyond member 14. In a preferred embodiment the band 28 is positioned over this obtuse angle 29 to create a reed element also having this obtuse angle.

In order to use the calling device, the user inserts the end of the calling device with the reed element in his mouth and forces the members 12 and 14 together by applying pressure with the user's teeth. This has the effect of closing the cavity formed between bows 20 and 22 from the outer edges of the cavity toward the center. The user then builds up air pressure behind the device in the mouth and slowly releases the pressure between the teeth. Since the members 12 and 14 are resilient, the cavity between bows 20 and 22 begins to be restored. With a cavity of small size, a high pitched whistle results. As the pressure on the members 12 and 14 is reduced, the size of the cavity between bows 20 and 22 increases and the pitch of the whistle drops.

The tension on the portion of the elastic band 28 which acts as a reed element is adjusted by the user to a desired extent. In using this device with a conventional grunt tube, a user can very closely imitate the whistle of a bull elk.

The above described embodiment of this device is simple to construct and easy to use and can be easily carried by the hunter or other persons seeking game in the wilderness. It is not complicated to use such as many of the other deer calling and elk calling devices on the market today and it is very effective in imitating the call of the bull elk.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:
1. A bull elk calling device comprising:
   a first and second rectangular, substantially coextensive, planar members;
   the first and second members being hingedly joined along corresponding longitudinal edges thereof, but with the first and second members being offset from one another thereby creating a lip portion of the first member extending beyond the second member at a first end of the device;
   the first and second members being bowed along their longitudinal axes thereof having a first bow at the first end of the device which is of small size which bow continues into a bow of larger size at a second end of the device opposite the first end;
   the first and second members being positioned opposing one another with their open concave sides facing one another to form a double-tapered cavity at the first end thereof sandwiched between the first and second members and extending in a direction transverse to their longitudinal axes;
   an endless elastic band is stretched around the first member transverse to the longitudinal axis of this member on the lip portion of the first member and is positioned at the entrance into the cavity formed between the first and second members to form a reed element;
   the first and second members further being constructed of resilient and flexible material such that when the two members are squeezed together, the size of the double-tapered cavity is substantially reduced beginning a the ends of the double-tapered cavity and working towards the center of the cavity and when pressure on the two members is released, the size of the double-tapered cavity is restored to its normal size.

2. A bull elk calling device according to claim 1 wherein the lip portion of the first member is bent upwardly towards the second member when the two members are facing one another, an obtuse angle being formed in the first member where the member is bent upwardly which is where the first member extends beyond the second member and wherein the endless elastic band is positioned over this obtuse angle so that a portion of the endless elastic band is disposed within the double-tapered cavity and the reed element formed thereby has a corresponding obtuse angle.

* * * * *